No. 811,007. PATENTED JAN. 30, 1906.
J. G. WALKER.
SELF FEEDING ATTACHMENT FOR THRESHING MACHINES.
APPLICATION FILED JUNE 20, 1903. RENEWED AUG. 12, 1905.
2 SHEETS—SHEET 1.
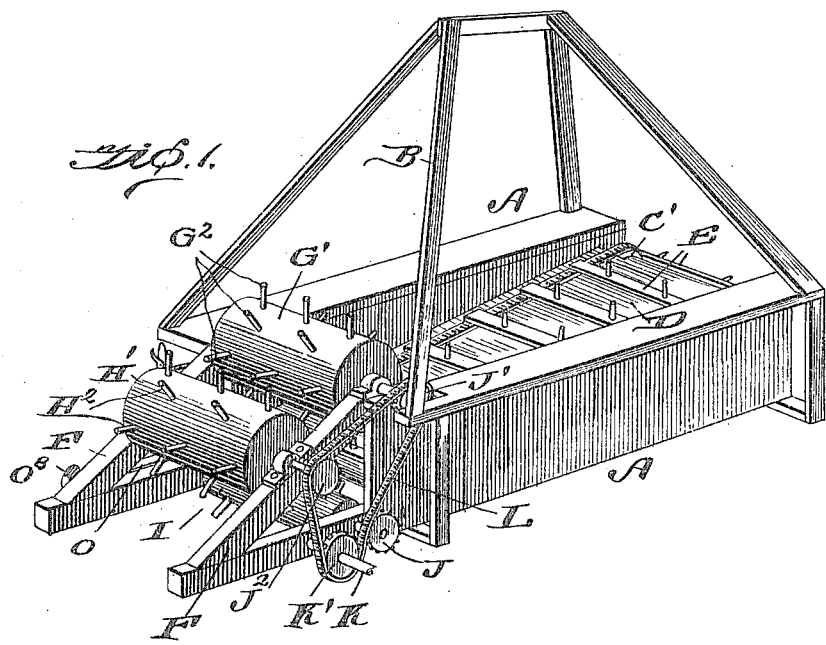
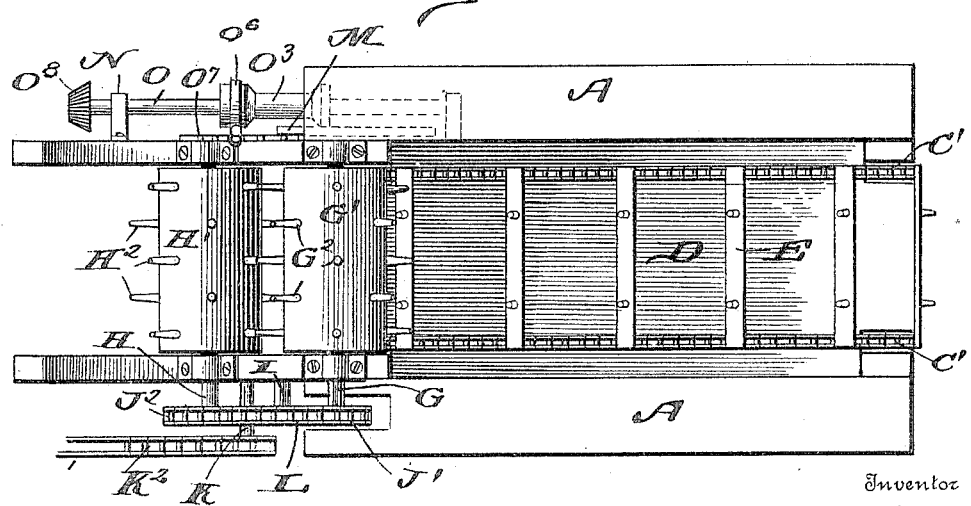
Witnesses
Inventor
James G. Walker.
By O'Meara + Brock,
Attorneys No. 811,007. PATENTED JAN. 30, 1906.
J. G. WALKER.
SELF FEEDING ATTACHMENT FOR THRESHING MACHINES.
APPLICATION FILED JUNE 20, 1903. RENEWED AUG. 12, 1905
2 SHEETS—SHEET 2.
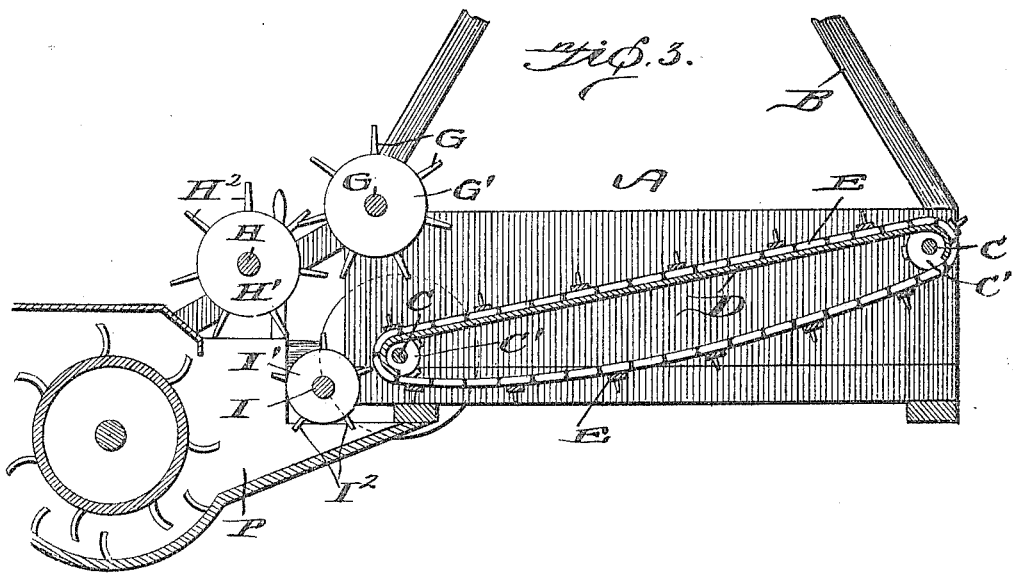
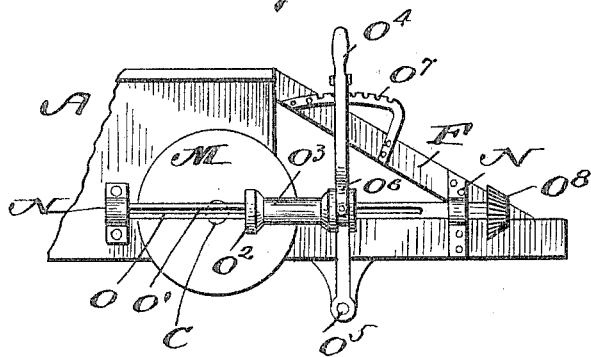

UNITED STATES PATENT OFFICE.

JAMES G. WALKER, OF MORO, OREGON.

SELF-FEEDING ATTACHMENT FOR THRESHING-MACHINES.

No. 811,007.　　　Specification of Letters Patent.　　　Patented Jan. 30, 1906.

Application filed June 20, 1903. Renewed August 12, 1905. Serial No. 274,013.

*To all whom it may concern:*

Be it known that I, JAMES G. WALKER, a citizen of the United States, residing at Moro, in the county of Sherman and State of Oregon, have invented a new and useful Self-Feeding Attachment for Threshing-Machines, of which the following is a specification.

My invention is an improvement in automatic feeding attachments for threshing-machines and is an improvement on the device for which Letters Patent No. 707,287 were granted to me August 19, 1902.

The object of this improvement is to provide a more satisfactory means for seizing, guiding, and carrying the straw from the forward end of the derrick-frame shown in said patent to the cylinder-chamber or to the feeder-elevator of the threshing-machine.

My invention consists of the novel features and combination of parts described hereinafter, particularly pointed out in the claim, and shown in the accompanying drawings, in which—

Figure 1 is a perspective view of my improvement. Fig. 2 is a plan view of the same. Fig. 3 is a vertical longitudinal section. Fig. 4 is a detail elevation showing the friction-gear.

In the above drawings, A represents a frame, termed a "derrick-table," and having mounted thereon a derrick B. Suitable shafts C and sprocket-pulleys C' are carried in the frame, around which runs a conveyer-belt E, the belt traveling downwardly in a forward direction above a plate D. All of these parts will be found in United States Letters Patent No. 707,287, designated by the same reference characters and described therein in detail, to which reference is had.

In advance of the frame A are arranged two parallel triangular-shaped brackets F. At the upper rear end of the brackets is journaled a shaft G, upon the inclined beam of the brackets is journaled a shaft H, and in the lower portion of the brackets and intermediate the shafts G and H is journaled a shaft I. The two upper shafts carry drums G' and H', approximately twenty inches in diameter and carrying a plurality of spikes $G^2$ and $H^2$, the spikes of one drum passing between those of the opposite drum and the drums rotating in the same direction. The drum I' is approximately about eight inches in diameter and is furnished with spikes $I^2$, the drum I' rotating in the opposite direction to the rotation of the drums G' and H'. The outer ends of the shafts immediately above mentioned carry on the outer side of one of the brackets sprocket-wheels J, J', and $J^2$, and adjacent the sprocket-wheel J, carried by the shaft I, is a stub-shaft K, carrying a drive-sprocket K'. A sprocket-chain L passes over the upper sprocket-wheels J' $J^2$ and around the idle wheel K' and bears on the lower sprocket-wheel J, which drives the chain.

On the opposite end of the shaft C' from the sprocket-wheel J is a friction-disk M. Journaled in brackets N is a shaft O, having a keyway O', the shaft O being adjacent and parallel to the disk M. A friction-pulley $O^2$, having a long hub $O^3$, slides along the shaft and contacts with the disk M. A lever $O^4$ is pivoted at $O^5$ to a depending bracket, and a band $O^6$ fits in a groove in the friction-pulley, the band being connected to or integral with the lever. The lever works in the usual manner in a rack-segment $O^7$, carried by the bracket F on that side of the frame. Any means may be provided for transmitting power to the shaft O from the threshing machinery, a bevel-gear $O^8$ being shown for this purpose.

The operation of the above-described mechanism will be obvious. The straw is carried by the conveyer to a point where it is caught by the spikes $G^2$ and fed by them to the drums H and I, the spikes on these drums forcing it into the feed-chute P of the thresher or feeder-elevator. The chain $K^2$ imparts motion to the drive-sprocket, which rotates the shaft I, sprocket-wheel J, chain L, and drums G and H, as will be well understood.

Having thus fully described my invention, what I claim as new, and desire to secure by Letters Patent, is—

The combination with a downwardly and forwardly traveling conveyer, of triangular-shaped brackets arranged adjacent the lower, forward end of the conveyer and comprising downwardly-inclined beams, a spiked drum rotatably journaled at the upper ends of the brackets, a second spiked drum journaled on the inclined beams intermediate their ends, the said drums being transverse to the conveyer and in a plane approximately parallel to that of the conveyer, a third spiked drum journaled in the brackets below the plane of the conveyer and in a perpendicular plane intermediate the two first-mentioned drums, and means for driving the conveyer and drums.

JAMES G. WALKER.

Witnesses:
R. J. GRIM,
L. BANNUM.